US008667551B2

(12) United States Patent
White et al.

(10) Patent No.: US 8,667,551 B2
(45) Date of Patent: Mar. 4, 2014

(54) SYSTEM FOR CONFIGURING A MEDIA PROCESSOR

(75) Inventors: Scott White, Austin, TX (US); James L. Cansler, Pflugerville, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 668 days.

(21) Appl. No.: 12/021,737

(22) Filed: Jan. 29, 2008

(65) Prior Publication Data

US 2009/0193489 A1    Jul. 30, 2009

(51) Int. Cl.
*H04N 7/173* (2011.01)
*H04N 7/16* (2011.01)
*H04N 7/14* (2006.01)
*H04N 5/44* (2011.01)

(52) U.S. Cl.
USPC ........ 725/131; 725/139; 725/151; 348/14.05; 348/734

(58) Field of Classification Search
None
See application file for complete search history.

(56) References Cited

U.S. PATENT DOCUMENTS

| | | | |
|---|---|---|---|
| 6,791,467 B1 * | 9/2004 | Ben-Ze'ev ................ 340/12.25 |
| 6,820,066 B1 * | 11/2004 | Reisinger et al. ............ 705/410 |
| 7,362,999 B2 * | 4/2008 | Petschke et al. ............. 455/3.02 |
| 2002/0021373 A1 * | 2/2002 | Shibamiya .................... 348/734 |
| 2002/0044225 A1 * | 4/2002 | Rakib ........................... 348/734 |
| 2003/0107684 A1 * | 6/2003 | Chang et al. .................. 348/734 |
| 2003/0110078 A1 | 6/2003 | Chang et al. |
| 2003/0182393 A1 | 9/2003 | Tobin et al. |
| 2004/0056984 A1 * | 3/2004 | Hayes et al. .................. 348/734 |
| 2004/0237115 A1 * | 11/2004 | Horiuchi et al. .............. 725/116 |
| 2005/0076393 A1 * | 4/2005 | Sussman ....................... 725/137 |
| 2005/0108751 A1 * | 5/2005 | Dacosta .......................... 725/39 |
| 2005/0193238 A1 * | 9/2005 | Golasky et al. .................. 714/6 |
| 2005/0246738 A1 * | 11/2005 | Lockett et al. ................. 725/43 |
| 2006/0022895 A1 * | 2/2006 | Williams et al. ............. 345/2.1 |
| 2006/0048194 A1 * | 3/2006 | Poslinski ........................ 725/81 |
| 2006/0136905 A1 | 6/2006 | Thissen et al. |
| 2006/0265117 A1 * | 11/2006 | Cahoon ......................... 701/114 |
| 2007/0124765 A1 * | 5/2007 | Bennett et al. .................. 725/38 |
| 2008/0282298 A1 * | 11/2008 | Ganesan et al. ................ 725/92 |

FOREIGN PATENT DOCUMENTS

JP    2002252789    9/2002

* cited by examiner

*Primary Examiner* — Ricky Chin
(74) *Attorney, Agent, or Firm* — Guntin & Gust, PLC; Jay H. Anderson

(57) ABSTRACT

A system that incorporates teachings of the present disclosure may include, for example, a media processor communicatively coupled to a remote controller by way of a wireless interface. The media processor can have a controller to wirelessly transmit to the remote controller provisioning information stored in the media processor for restoring at least a portion of the provisioning information stored in the media processor. Other embodiments are disclosed.

22 Claims, 6 Drawing Sheets

200

SYSTEM FOR CONFIGURING A MEDIA PROCESSOR

FIELD OF THE DISCLOSURE

The present disclosure relates generally to configuration techniques for media processors and more specifically to a system for configuring a media processor.

BACKGROUND

Media processors such as set top boxes (STBs), digital video recorders (DVRs), and/or media players (such as iPods™) have substantially evolved in sophistication. Some manufacturers of media processors have integrated the functionalities of an STB, DVR and media player into a single device or family of devices.

Complex media processors frequently require the expertise of a field technician to install and program the media processor at a subscriber's premises. After installation, the subscriber can program preferences in the media processor such as DVR recording times, customization of an electronic programming guide, reprogramming by the subscriber of channel numbers for ease of channel browsing, and so on. The subscriber can also store movies from a video on demand catalog, music files and corresponding play lists, and personal pictures and video libraries.

Over the course of the subscriber's use of the media processor, provisioning information recorded in part by the technician and the subscriber as well as libraries of media content recorded by the subscriber in the media processor can be substantial and complex.

DETAILED DESCRIPTION

One embodiment of the present disclosure entails a remote controller that manages operations of a Set-Top Box (STB) having a controller to establish wireless communications with the STB, request provisioning information of the STB, receive from the STB the requested provisioning information, and record the requested provisioning information to restore a provisioning state of the STB or to provision a new STB.

Another embodiment of the present disclosure entails a computer-readable storage medium in a remote controller that manages operations of a media processor by way of a wireless interface. The storage medium of the remote controller can have computer instructions for recording at least one among provisioning information and media content stored in the media processor.

Yet another embodiment of the present disclosure entails a media processor communicatively coupled to a remote controller by way of a wireless interface. The media processor can have a controller to wirelessly transmit to the remote controller provisioning information stored in the media processor for restoring at least a portion of the provisioning information stored in the media processor. In this embodiment the remote controller can serve in part as a backup storage device that can mitigate a loss or corruption of all or a portion of the provisioning information stored in the media processor.

Another embodiment of the present disclosure entails a storage medium having a portable memory for coupling to a remote controller that manages operations of a media processor over a wireless interface. The portable memory can store provisioning information retrieved from the media processor by the remote controller for restoring at least a portion of the provisioning information stored in the media processor.

Figure 1:
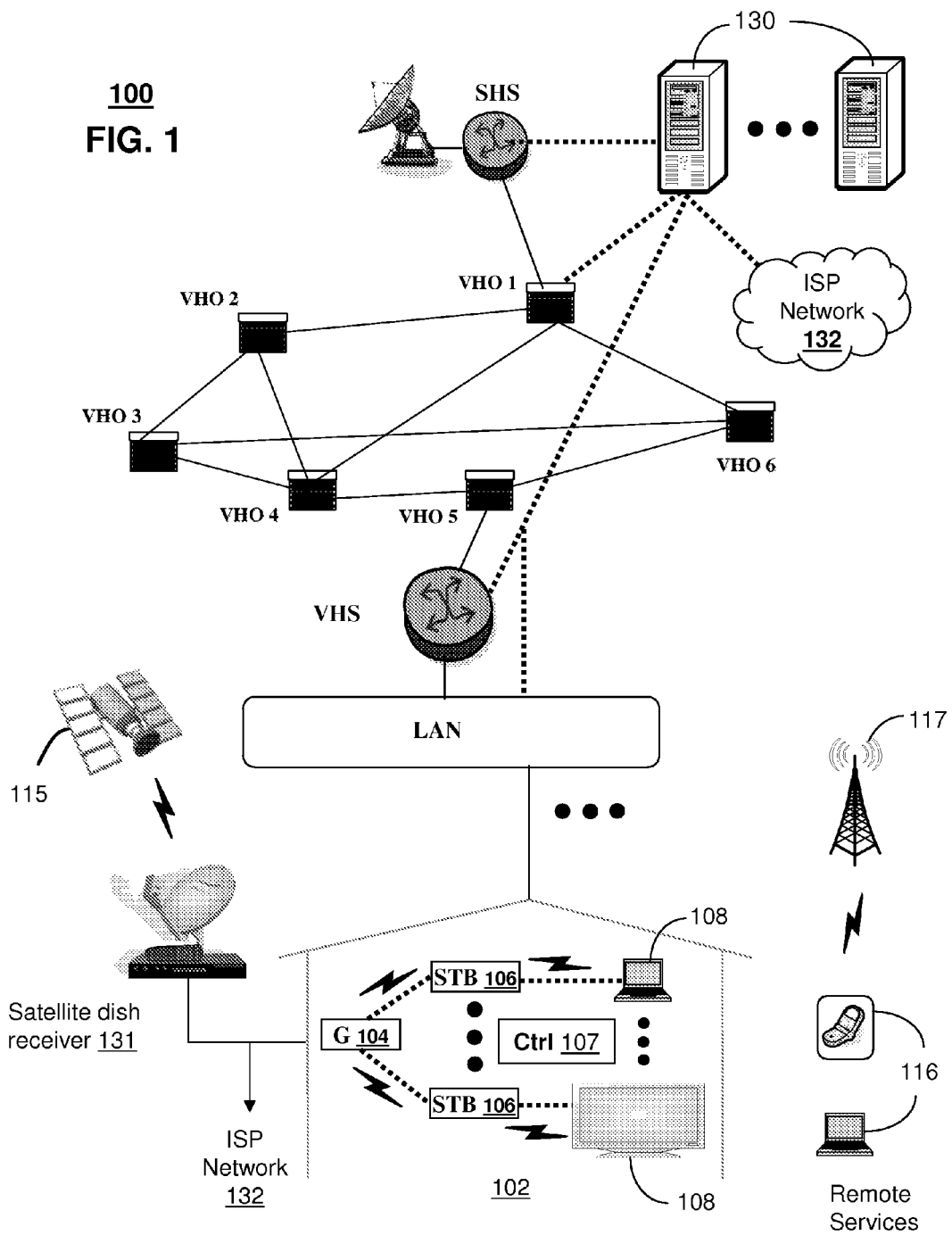
FIGS. 1-3 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
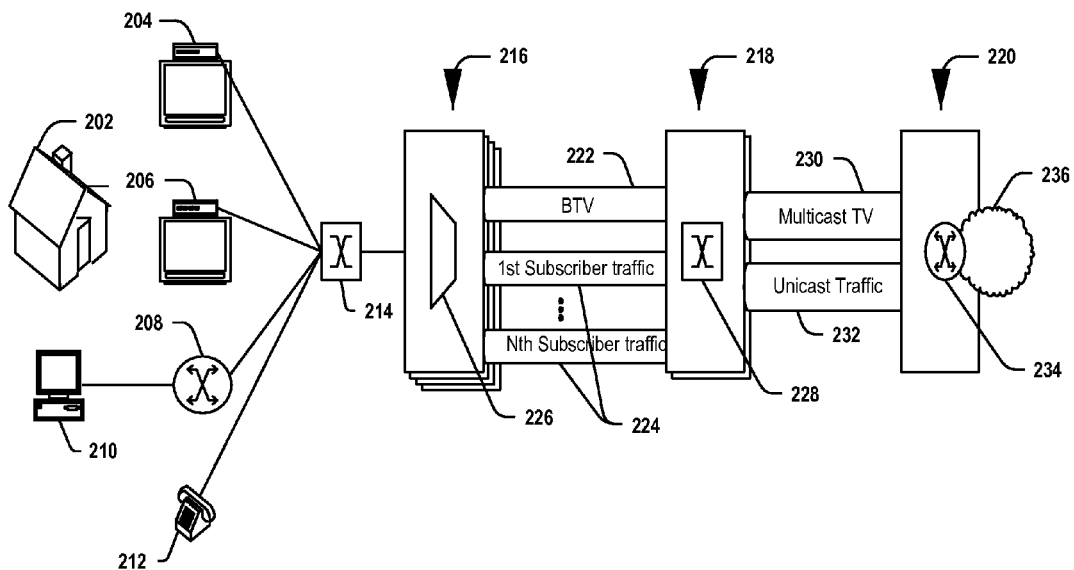

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
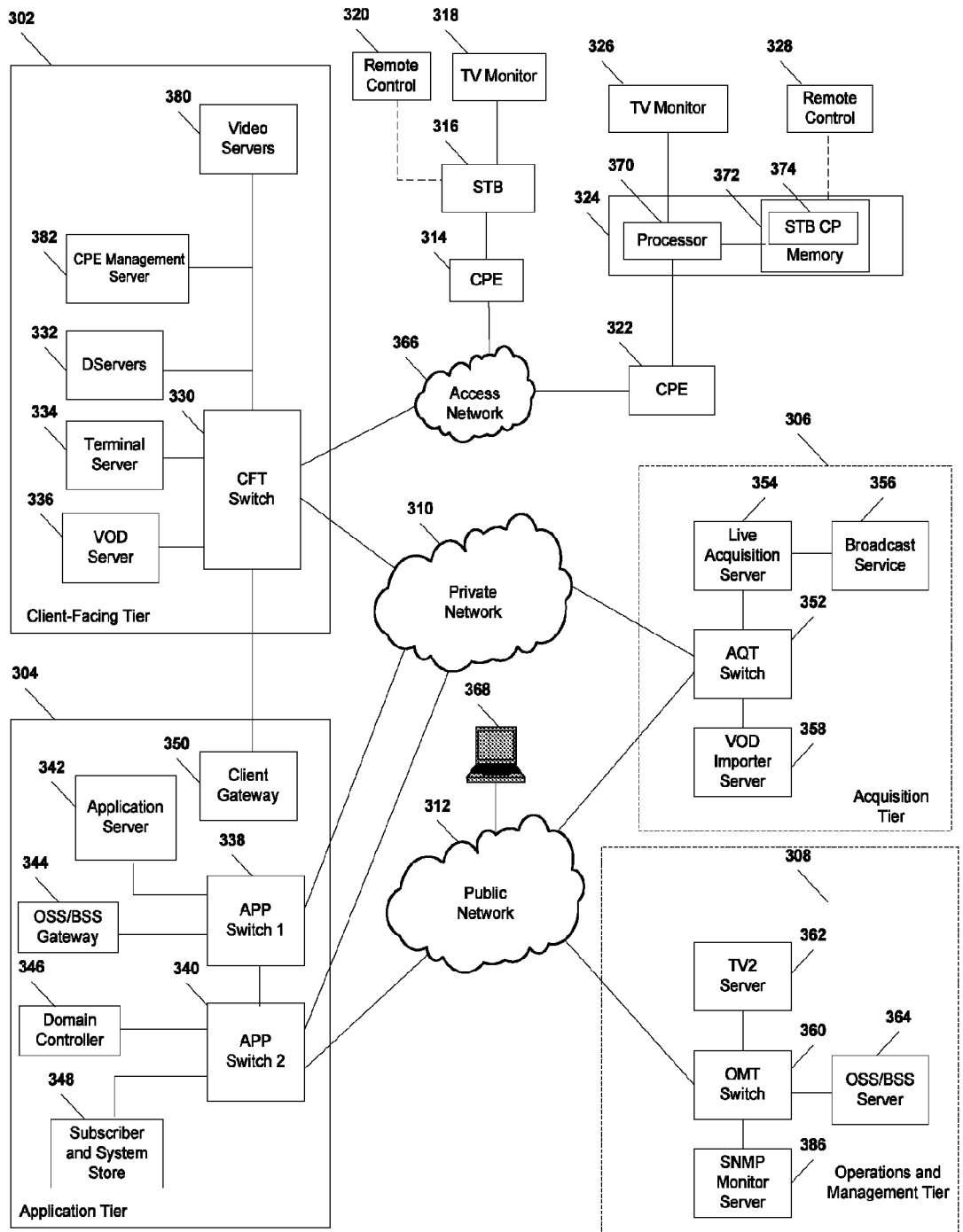

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366.

The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
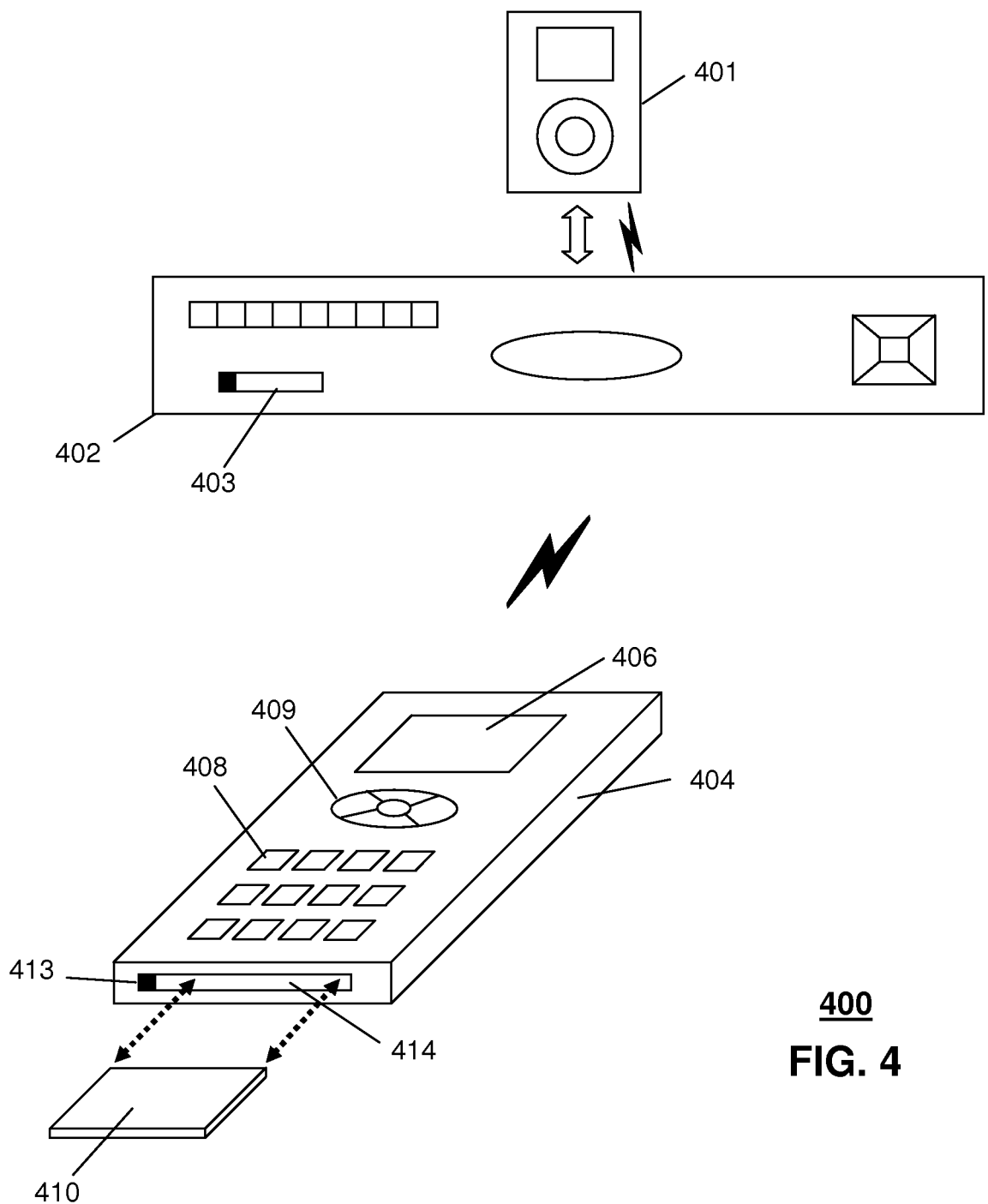
FIG. 4 depicts an exemplary embodiment of a remote controller and media processor.

FIG. 4 depicts an exemplary embodiment of a media processor 402 and remote controller 404. The media processor 402 can represent the STBs 106, 204, 206, 316, 324 of FIGS. 1-3. In another illustrative embodiment, the media processor 402 can represent a DVR integrated in an STB or coupled to the STB. In yet another illustrative embodiment, the media processor 402 can represent a media player 401 such as an iPod™ or other suitable media player coupled to the STB by a cradle of the STB or coupled by a wireless interface (e.g., WiFi or Bluetooth). References to the media processor 402 can thus represent an STB, DVR or media player 401 singly or in combination.

The remote controller 404 can represent the remote control devices of FIGS. 1-3, which can be used to manage operations of the media processor 402. The remote controller 404 can include a common display 406 (such as an LCD display), a keypad 408 and navigation disk 409 for manipulating operations of the media processor 402, common audio presentation technology, common communication technology, and a common controller such as a microprocessor for managing operations of the foregoing components. The remote controller 404 can also have a media slot 414 that can slidably engage to a portable memory 410. The portable memory 410 can be removed with a common lever mechanism 413 that can be depressed to slidably disengage the portable memory. The portable memory 410 can be a Flash memory (or other suitable forms of non-volatile memory) which can be housed in a common form factor such as an SD card (or Secure Digital card) memory, mini SD card, micro SD card, or other suitable form factor.

The remote controller 404 can utilize common wireless access technologies such as infrared, Bluetooth or WiFi to communicate with the media processor 402. The remote controller 404 can wireless transmit media commands to the media processor 402 such as for example channel programming commands, electronic programming guide (EPG) browsing commands, VoD catalog browsing commands, backup memory commands, memory restoration commands, and so on.

Backup memory commands can represent a request to retrieve provisioning information and/or media content stored in the media processor 402. For example, the remote controller 404 can request that the media processor 402 transmit all or a portion its provisioning information for backup purposes or to transfer between devices. The provisioning information retrieved by the remote controller 404 can be recorded in the portable memory 410. Similar retrieval can be made for media content stored in the media processor 402. If the media processor 402 experiences a malfunction or loss of the information, the remote controller 404 can be directed to transmit to the media processor portions or all of the information lost to restore operations. Alternatively, the portable memory 410 can be removed with lever 413 and can be inserted in a media slot of the media processor 402 to restore provisioning and/or lost media content. Similarly, the portable memory 410 can be transferred by the subscriber between remote controllers 404 and media processors 402 for upgrading existing media processors, or for programming new ones.

Figure 5:
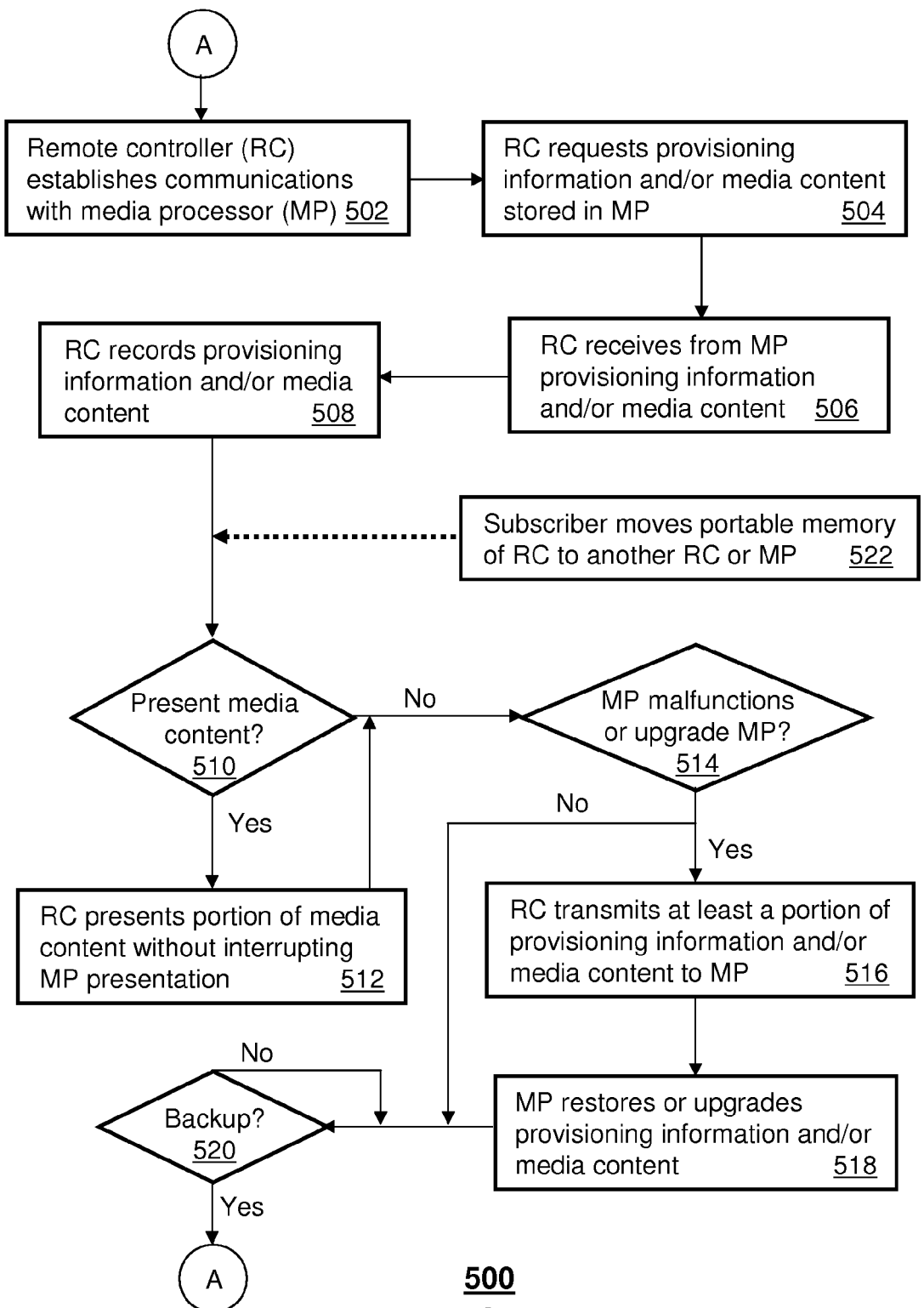
FIG. 5 depicts an exemplary method applied to portions of the embodiments of FIGS. 1-4.

With the foregoing embodiments in mind, FIG. 5 depicts an exemplary method 500 operating in portions of the embodiments presented in FIGS. 1-4. Method 500 begins with step 502 in which the remote controller (RC) 404 establishes communications with the media processor (MP) 402 by wireless means as previously described. In step 504, the RC 404 can request by way of a media command transmitted to the MP 402 the provisioning information and/or media content stored in the MP.

Provisioning information can represent for example settings established to manage operations of the MP 402. The settings can be operational settings established by the service provider of the media communication systems of FIGS. 1-3, operational settings established by the subscriber of the MP 402, or a combination thereof. The settings can also represent user preference settings established by the subscriber, DVR settings, and/or play lists of media content stored in the MP 402—among other things. Generally speaking provisioning information can represent any configurable aspect of the MP 402, while media content can represent audio content, still image content, moving image content, or combinations thereof stored in the MP 402.

In step 506 the RC 404 receives the provisioning information and/or media content from the MP 402 and records it in step 508 in the portable memory 410 by common means. The subscriber has the option to request in step 510 by way of a graphical user interface (or UI) of the RC 404 a presentation of portions of the media content. If such a request is made, the RC 404 proceeds to step 512 where it makes the presentation. The presentation can be audio or visual by way of the audio component of the RC 404 and display 406. If the subscriber does not request a presentation or is finished with a presentation, the RC 404 can proceed to step 514 where it checks for malfunctions in the MP 402 or a need to upgrade the MP because it is a new MP or because the MP has an older version of provisioning information and/or media content. Step 514 can also be managed at the discretion of the subscriber. That is, the subscriber can make the determination of step 514 rather than delegate it to an automation function in the RC 404.

If any one of the conditions for a transfer of the information in the RC 404 is satisfied, the RC can be directed in step 516 to transmit to the MP 402 at least a portion of the provisioning information and/or media content that needs to be upgraded or needed to mitigate a corruption or loss of information stored in the MP. The portion transmitted can be used by the MP 402 in step 518 to restore or upgrade in whole or in part the provisioning information and/or media content.

Once the restoration or upgrade has taken place, or if neither condition in step 514 is triggered, the RC 404 can proceed to step 520 where it can check for the need for incremental or complete backups of the provisioning information and/or media content stored in the MP 402. Incremental backups can represent a partial request for the provisioning information and/or media content based only on changes made thereof. Complete backups can represent full retrieval of provisioning information and/or media content from the MP 402 being protected. The periodicity of backups made by the RC 404 can be provisioned by the subscriber (e.g., once per day, during off hours, etc.).

It should be noted that a subscriber can have multiple RCs 404 and MPs 402 in a residence. Since the portable memory 410 can be moved between RCs 404 and/or MPs 402, the subscriber can also trigger steps 506-514 by porting the portable memory in step 522 between devices.

Upon reviewing the aforementioned embodiments, it would be evident to an artisan with ordinary skill in the art that said embodiments can be modified, reduced, or enhanced without departing from the scope and spirit of the claims described below. For example, steps 516-518 can be adapted so that when the subscriber moves the portable memory 410 from the RC 404 to the MP 402 the restoration or upgrade process is controlled exclusively by the MP. In another illustrative embodiment, the subscriber can insert the portable memory 410 in an MP 402 or RC of another subscriber's RC or MP for purposes of exchanging provisioning information and/or media content between the MPs of the subscribers.

Other suitable modifications that can be applied to the present disclosure without departing from the scope of the claims below. Accordingly, the reader is directed to the claims section for a fuller understanding of the breadth and scope of the present disclosure.

Figure 6:
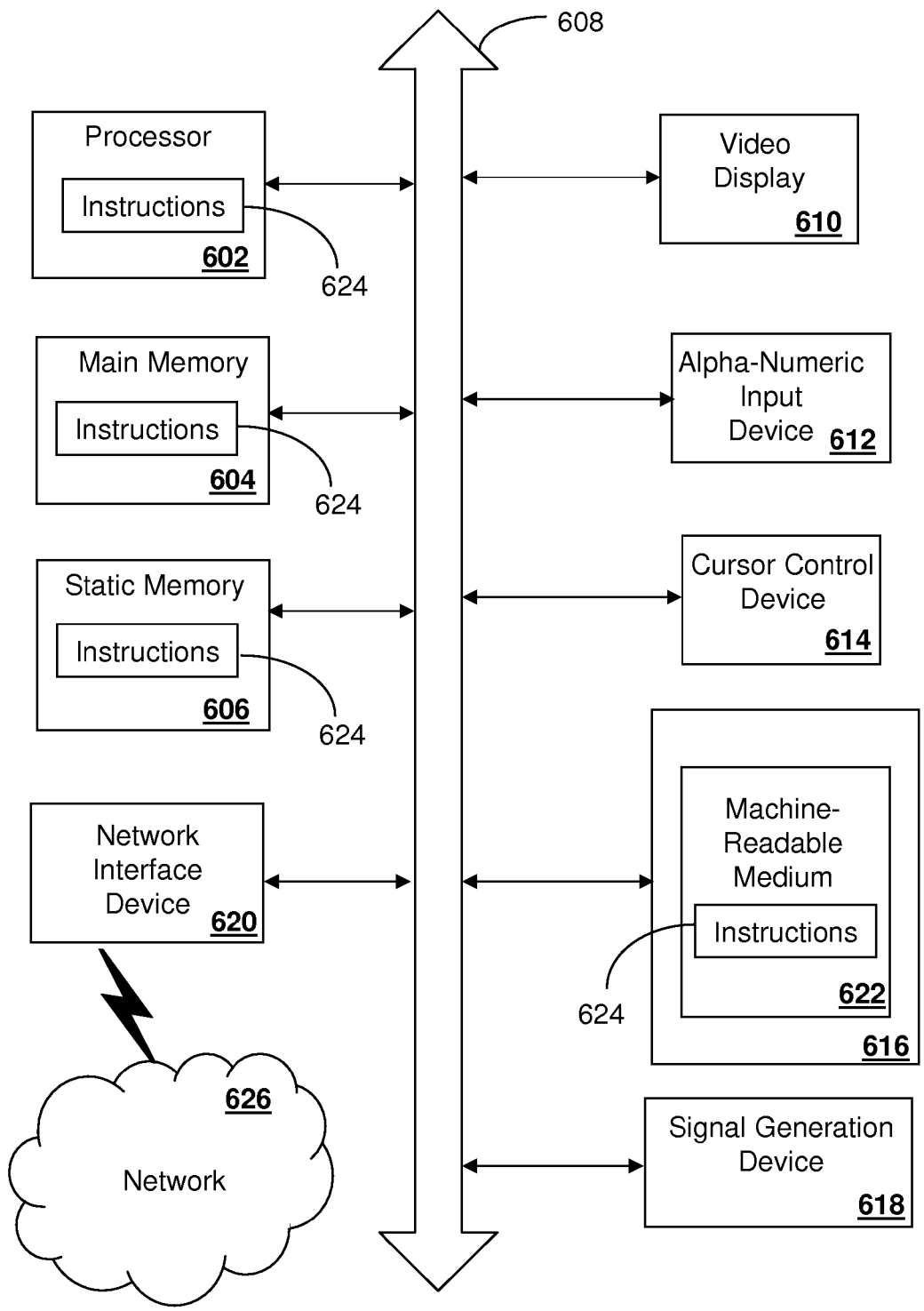
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A remote control device that manages operations of a set-top box, the remote control device comprising:
  a transceiver configured to wirelessly communicate directly with the set-top box; and
  a controller coupled to a memory comprising computer instructions, which when executed by the controller causes the controller to perform operations comprising:
    establishing wireless communications directly with the set-top box;
    providing a request for all or part of provisioning information directly to the set-top box using wireless communication, the provisioning information comprising operational settings established by a service provider;
    receiving directly from the set-top box the requested provisioning information using the wireless communication;
    automatically detecting by the remote control device whether a malfunction of the set-top box has occurred;
    recording the requested provisioning information to restore a provisioning state of the set-top box upon detecting a malfunction in the set-top box;
    requesting media content stored in the set-top box;
    receiving from the set-top box the requested media content; and
    recording the requested media content, wherein the media content comprises at least audio content; and
  a portable memory for storing the requested provisioning information and the media content, wherein the portable memory when engaged with the remote control device is coupled to the controller, and wherein the operations further comprise:
    wirelessly uploading or transmitting the requested provisioning information and the requested media content automatically from the portable memory to the set-top box to restore a provisioning state and requested media content of the set top box responsive to a detected malfunction in the set top box, responsive to when an upgrade for the set top box is detected due to detection of a new set top box, responsive to when an older version of provisioning information is detected at the set top box, and responsive to when an older version of media content is detected at the set top box; and
    automatically uploading the provisioning information to the remote control device or the set-top box responsive to detecting engagement of the portable memory with the remote control device or with the set-top box resulting from porting of the portable memory,
    wherein subsequent to porting the portable memory from the remote control device to the set-top box, a restoration or upgrade process relating to the provisioning state or the media content of the set-top box is controlled exclusively by the set-top box.

2. The remote control device of claim 1, wherein the portable memory is slidably engaged in a media slot of the remote controller, wherein the portable memory can be selectively engaged with the set-top box, and wherein the portable memory is configured for use with other remote controllers, computers, cellular phones, personal digital assistants and telematic systems of automobiles.

3. The remote control device of claim 1, wherein the controller is adapted to transmit the recorded provisioning information to a second set-top box.

4. The remote control device of claim 1, wherein the controller is adapted to restore the media content in the set-top box or transmit the recorded media content to a new set-top box.

5. The remote control device of claim 1, comprising a display, wherein the controller is adapted to present a portion of the recorded media content on the display without interrupting a presentation of a media program on a media presentation device managed by the set-top box.

6. The remote control device of claim 1, wherein the media content further comprises at least one of still image content or moving image content.

7. A non-transitory computer-readable storage medium comprising computer instructions which, when executed by a processor of a remote controller, cause the processor to perform operations comprising:
  obtaining all or part of provisioning information and media content directly from a media processor via a wireless interface, wherein the remote controller manages operations of the media processor by way of the wireless interface, and the provisioning information comprises operational settings established by a service provider and user preference settings established by a subscriber to the service provider;
  recording the provisioning information and the media content stored in the media processor;
  presenting the media content on a display of the remote controller utilizing the provisioning information;
  automatically detecting by the remote controller whether a malfunction of the media processor has occurred; and
  automatically uploading or transmitting the provisioning information and the media content to restore a provisioning state of the media processor and media content of the media processor responsive to a detected malfunction in the media processor and responsive to when an upgrade for the media processor is detected due to detection of a new media processor, wherein the media content comprises at least audio content; and
  automatically uploading the provisioning information to the remote controller or the media processor responsive to detecting engagement of a portable memory with the remote controller or with the media processor resulting from porting of the portable memory,
  wherein subsequent to porting the portable memory from the remote controller to the media processor, a restoration or upgrade process relating to the provisioning state or the media content of the media processor is controlled exclusively by the media processor.

8. The non-transitory storage medium of claim 7, wherein the media processor comprises a set-top box or a digital video recorder, and wherein the media content further comprises still image content or moving image content.

9. The non-transitory storage medium of claim 8, wherein the provisioning information further comprises user preference settings of the set-top box or the digital video recorder.

10. The non-transitory storage medium of claim 7, wherein the portable memory is engaged with the remote controller and coupled to the processor, and the recording operation further comprises storing the recorded provisioning information and the recorded media content singly or in combination in the portable memory.

11. The non-transitory storage medium of claim 10, wherein the portable memory is slidably engaged in a media slot of the remote controller, and wherein the portable memory is configured for use by other remote controllers, computers, cellular phones, personal digital assistants, and telematic systems of automobiles.

12. The non-transitory storage medium of claim 7, wherein the operations further comprise presenting in a display of the remote controller the recorded media content without interrupting a presentation of a media program on a media presentation device managed by the media processor.

13. The non-transitory storage medium of claim 7, wherein the operations further comprise requesting the recording of the provisioning information and the media content stored in the media processor.

14. A media processor managed by a remote controller communicatively coupled by way of a wireless interface, the media processor comprising:
   a memory to store instructions, to store provisioning information associated with operation of the media processor, and to store media content comprising at least audio content, wherein the provisioning information comprises operational settings established by a service provider; and
   a controller coupled to the memory, wherein responsive to executing the instructions, the controller performs operations comprising:
      wirelessly transmitting directly to the remote controller all or part of the provisioning information and the media content stored in the media processor; and
      in accordance with uploading or transmitting of the provisioning information and the media content automatically from a portable memory of the remote controller, restoring a provisioning state of the media processor and restoring a portion of the media content responsive to the remote controller automatically detecting a malfunction in the media processor, responsive to when an upgrade for the media processor is detected due to detection of a new media processor, responsive to when an older version of provisioning information is detected at the media processor, and responsive to when an older version of media content is detected at the media processor; and
      automatically uploading the provisioning information to the remote controller or the media processor responsive to detecting engagement of the portable memory with the remote controller or with the media processor resulting from porting of the portable memory,
      wherein subsequent to porting the portable memory from the remote controller to the media processor, a restoration or upgrade process relating to the provisioning state or the media content of the media processor is controlled exclusively by the media processor.

15. The media processor of claim 14, wherein the media processor comprises a set-top box, a digital video recorder or a portable media player, wherein the media content further comprises still image content or moving image content, and wherein the media processor operates in a media communication system corresponding to an Internet Protocol Television communication system, a cable television communication system or a satellite television communication system.

16. The media processor of claim 15, wherein the provisioning information further comprises user preference settings or play lists of the set-top box, the digital video recorder or the portable media player.

17. The media processor of claim 14, wherein the wireless interface operates according to one among a Bluetooth, Wireless Fidelity or infrared wireless access technology, and wherein the operations further comprise:
   detecting a defect in a portion of the provisioning information stored in the media processor;
   submitting a request to the remote controller for a copy of a portion of the provisioning information recorded therein;
   receiving from the remote controller the requested portion of the provisioning information; and
   restoring the defective portion of the provisioning information with the portion of provisioning information received from the remote controller.

18. The media processor of claim 14, wherein the portable memory can removably engage with the remote controller, and wherein the portable memory can removably engage with the media processor to restore the provisioning state of the media processor.

19. A non-transitory storage medium, comprising
   a portable memory for selectively engaging with a remote controller and with a media processor,
      wherein the remote controller manages operations of the media processor over a wireless interface,
      wherein the portable memory stores provisioning information and media content wirelessly retrieved directly from the media processor by the remote controller, the provisioning information comprising operational settings established by a service provider,
      wherein a provisioning state of the media processor is wireles sly restored in accordance with wireless uploading of all or part of the provisioning information and wireless uploading of the media content automatically from the portable memory, responsive to the remote controller automatically detecting a malfunction in the media processor, and when the remote controller detects an upgrade for the media processor due to detection of a new media processor,
      wherein the provisioning information is uploaded to the remote controller or the media processor responsive to detecting engagement of the portable memory with the remote controller or with the media processor resulting from porting of the portable memory, and
      wherein subsequent to porting the portable memory from the remote controller to the media processor, a restoration or upgrade process relating to the provisioning state or the media content of the media processor is controlled exclusively by the media processor.

20. The storage medium of claim 19, wherein the provisioning information recorded in the portable memory is used to restore the provisioning information of the media processor, wherein the media processor comprises a Set-Top Box, a Digital Video Recorder or a portable media player, and wherein the provisioning information further comprises user preference settings or play lists of the set-top box, the digital video recorder or the portable media player.

21. The storage medium of claim 19, wherein the portable memory is engaged with the media processor.

22. The storage medium of claim 19, wherein the portable memory stores media content stored in the media processor while coupled to the remote controller, wherein the remote controller presents the media content in a display of the remote controller, and wherein the media content further comprises still image content or moving image content.

* * * * *